United States Patent
Ohtani et al.

(10) Patent No.: US 7,790,806 B2
(45) Date of Patent: Sep. 7, 2010

(54) FLUORINE-CONTAINING RESIN COMPOSITION INHIBITING CORROSIVENESS

(75) Inventors: Katsuhide Ohtani, Settsu (JP); Tsuyoshi Ono, Settsu (JP); Haruhisa Masuda, Settsu (JP); Ron Klein, Orangeburg, NY (US); Masakazu Irie, Ichihara (JP); Kazuo Kobayashi, Ichihara (JP); Igor Chorvath, Midland, MI (US); Tatyana Collins, Midland, MI (US); Lauren Tonge, Midland, MI (US)

(73) Assignees: Dow Corning Corporation, Midland, MI (US); Dow Corning Toray Co., Ltd., Tokyo-to (JP); Daikin Industries, Ltd., Osaka-fu (JP); Daikin America, Inc., Orangeburg, NY (US)

( * ) Notice: Subject to any disclaimer, the term of this patent is extended or adjusted under 35 U.S.C. 154(b) by 143 days.

(21) Appl. No.: 12/127,057

(22) Filed: May 27, 2008

(65) Prior Publication Data
US 2008/0300365 A1 Dec. 4, 2008

Related U.S. Application Data

(60) Provisional application No. 60/940,500, filed on May 29, 2007, provisional application No. 60/952,888, filed on Jul. 31, 2007.

(51) Int. Cl.
*C08L 27/18* (2006.01)

(52) U.S. Cl. .................................................. 525/104
(58) Field of Classification Search .................. 525/104
See application file for complete search history.

(56) References Cited

U.S. PATENT DOCUMENTS

| 4,028,431 | A | * | 6/1977 | Futami et al. | 525/104 |
| 4,260,698 | A | * | 4/1981 | Tatemoto et al. | 525/102 |
| 4,626,587 | A | | 12/1986 | Morgan et al. | |
| 5,554,689 | A | * | 9/1996 | Langstein et al. | 525/102 |
| 7,173,092 | B2 | * | 2/2007 | Gornowicz et al. | 525/104 |
| 7,348,366 | B2 | * | 3/2008 | Walker et al. | 522/148 |
| 7,479,532 | B2 | * | 1/2009 | Tonge | 528/24 |
| 2006/0041064 | A1 | * | 2/2006 | Gornowicz et al. | 525/104 |

FOREIGN PATENT DOCUMENTS

| JP | 4623245 | 7/1971 |
| JP | 60171110 | 9/1985 |

\* cited by examiner

*Primary Examiner*—Bernard Lipman
(74) *Attorney, Agent, or Firm*—Dinsmore & Shohl LLP

(57) ABSTRACT

The present invention relates to a fluorine-containing resin composition for molding comprising a fluorine-containing resin (A) and a hydrofluoric acid scavenger (B), in which the hydrofluoric acid scavenger (B) is organopolysiloxane. According to the present invention, a fluorine-containing resin composition which can reduce an amount of hydrofluoric acid released from a fluorine-containing resin and inhibits corrosiveness can be provided.

13 Claims, No Drawings

FLUORINE-CONTAINING RESIN COMPOSITION INHIBITING CORROSIVENESS

CROSS-REFERENCE TO RELATED APPLICATIONS

This application claims the benefit of U.S. Provisional Application No. 60/940,500, filed May 29, 2007 and U.S. Provisional Application No. 60/952,888, filed Jul. 31, 2007. The entire contents of said applications are hereby incorporated by reference.

BACKGROUND OF THE INVENTION

The present invention relates to a fluorine-containing resin composition which can reduce an amount of hydrofluoric acid released from a fluorine-containing resin and inhibits corrosiveness.

It is well known that hydrofluoric acid is released from a fluorine-containing resin and various materials such as metals are subject to deterioration and corrosion due to the released hydrofluoric acid. Therefore expensive corrosion resistant materials such as Hastelloy and Inconel must be used on a molding machine for fluorine-containing resins (especially portions contacting a polymer such as a metallic mold, cylinder and screw), thereby resulting in economical disadvantage.

Such hydrofluoric acid is generated due to decomposition of an unstable end of a fluorine-containing resin, decomposition of an unstable portion such as a head to head bond in a trunk chain of hexafluoropropylene or a de-HF reaction of a vinylidene fluoride portion.

For inhibiting release of hydrofluoric acid, there are proposed a method of decreasing the number of unstable ends, thus reducing hydrofluoric acid releasing sources and a method of applying a shearing force when extruding for pelletizing to previously eliminate unstable portions in a trunk chain (e.g. JP46-23245B, JP 60-171110).

However, in any of the above-mentioned methods, there still remains a problem that special steps are necessary and cost is high.

SUMMARY OF THE INVENTION

The present invention provides a fluorine-containing resin composition which can reduce an amount of hydrofluoric acid released from a fluorine-containing resin and inhibits corrosiveness.

Namely, the present invention relates to a fluorine-containing resin composition for molding comprising a fluorine-containing resin (A) and a hydrofluoric acid scavenger (B), in which the hydrofluoric acid scavenger (B) is organopolysiloxane.

It is preferable that the hydrofluoric acid scavenger (B) is contained in an amount of not less than 1 part by mass and less than 30 parts by mass based on 100 parts by mass of the fluorine-containing resin (A).

When the fluorine-containing resin (A) comprises a perfluororesin, an especially excellent effect can be exhibited.

Examples of the perfluororesin are, for instance, copolymers comprising a tetrafluoroethylene unit and a perfluoro ethylenically unsaturated compound unit represented by the formula (1):

  (1)

wherein $R_f^1$ represents —$CF_3$ and/or —$OR_f^2$; $R_f^2$ represents a perfluoroalkyl group having 1 to 5 carbon atoms.

Also, example of the fluorine-containing resin (A) is a non-perfluororesin comprising a copolymer comprising 20 to 80% by mole of a tetrafluoroethylene unit and 80 to 20% by mole of an ethylene unit, or a copolymer comprising 19 to 90% by mole of a tetrafluoroethylene unit, 9 to 80% by mole of an ethylene unit and 1 to 72% by mole of a perfluoro ethylenically unsaturated compound unit represented by the formula (1):

$$CF_2=CF-R_f^1 \quad (1)$$

wherein $R_f^1$ represents —$CF_3$ and/or —$OR_f^2$; $R_f^2$ represents a perfluoroalkyl group having 1 to 5 carbon atoms.

Further, example of the fluorine-containing resin (A) is one comprising a fluorine-containing ethylenic polymer (a) having a carbonyl group-containing end group.

In addition, it is preferable that the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

DETAILED DESCRIPTION

The present invention relates to the fluorine-containing resin composition for molding comprising the fluorine-containing resin (A) and the hydrofluoric acid scavenger (B), in which the hydrofluoric acid scavenger (B) is organopolysiloxane.

The fluorine-containing resin (A) is not specifically limited, and in the case of the fluorine-containing resin (A) comprising a perfluororesin liable to generate hydrofluoric acid, an effect of scavenging hydrofluoric acid is exhibited especially remarkably.

Preferable examples of the perfluororesin are copolymers comprising a tetrafluoroethylene unit and a perfluoro ethylenically unsaturated compound unit represented by the formula (1):

$$CF_2=CF-R_f^1 \quad (1)$$

wherein $R_f^1$ represents —$CF_3$ and/or —$OR_f^2$; $R_f^2$ represents a perfluoroalkyl group having 1 to 5 carbon atoms, from the viewpoint of excellent heat resistance, oil resistance, electrical properties and flame retardance of the obtained fluorine-containing resin composition and easy mold-processing.

Examples of the perfluoro ethylenically unsaturated compound are hexafluoropropylene, and in addition, perfluoro (alkyl vinyl ethers) such as perfluoro(methyl vinyl ether), perfluoro(ethyl vinyl ether) and perfluoro(propyl vinyl ether).

Specifically there are combinations such as TFE/hexafluoropropylene (hereinafter referred to as HFP) copolymer, TFE/$CF_2=CF-OR_f^2$ and TFE/HFP/$CF_2=CF-OR_f^2$.

Among them, preferable is TFE/HFP/$CF_2=CF-OR_f^2$, more preferable is a fluorine-containing ethylenic polymer comprising 77 to 95% by mole of a TFE unit, 5 to 20% by mole of a HFP unit and 0.1 to 3% by mole of a —$CF_2=CF-OR_f^2$ unit, and further preferable is a fluorine-containing ethylenic polymer comprising 90 to 93% by mole of a TFE unit, 7 to 10% by mole of a HFP unit and 0.3 to 1% by mole of a —$CF_2=CF-OR_f^2$ unit, in that they are excellent in stress crack resistance and are advantageous from economical point of view.

The melting point of these perfluororesins is 120° to 310° C., preferably 120° to 270° C. The melting point can be set by a copolymerization ratio of TFE to the perfluoro ethylenically unsaturated compound represented by the above-mentioned formula (1).

Also, a non-perfluororesin can be exemplified as the fluorine-containing resin (A).

There are raised, as a fluoroolefin constituting the fluorine-containing resin, for example, chlorotrifluoroethylene (hereinafter referred to as CTFE), trifluoroethylene, hexafluoroisobutene, vinylidene fluoride (hereinafter referred to as VdF), vinyl fluoride, and a compound represented by the formula (2):

$$CH_2=CX^2(CF_2)_nX^3 \quad (2)$$

wherein $X^2$ is a hydrogen atom or a fluorine atom; $X^3$ is a hydrogen atom, a fluorine atom or a chlorine atom; n is an integer of 1 to 10.

Also, in the fluorine-containing resin (A), a non-fluorine-containing ethylenically unsaturated compound other than the above-mentioned fluoroolefin and perfluoroolefin may be copolymerized. Examples of the non-fluorine-containing ethylenically unsaturated compound are, for instance, ethylene, propylene and alkyl vinyl ethers. Here the alkyl vinyl ethers are those containing an alkyl group having 1 to 5 carbon atoms.

Specifically, there are non-perfluororesins such as a copolymer comprising 20 to 80% by mole of a tetrafluoroethylene unit and 80 to 20% by mole of an ethylene unit and a copolymer comprising 19 to 90% by mole, preferably 20 to 70% by mole of a tetrafluoroethylene unit, 9 to 80% by mole, preferably 20 to 60% by mole of an ethylene unit, and 1 to 72% by mole, preferably 1 to 60% by mole of a perfluoro ethylenically unsaturated compound unit represented by the formula (1):

$$CF_2=CF-R_f^1 \quad (1)$$

wherein $R_f^1$ represents —$CF_3$ and/or —$OR_f^2$; $R_f^2$ represents a perfluoroalkyl group having 1 to 5 carbon atoms, since the fluorine-containing resin composition is excellent in heat resistance and oil resistance and mold-processing is easy.

Also, the fluorine-containing ethylenic polymer comprising TFE and ethylene may contain a third component. Examples of the third component are 2,3,3,4,4,5,5-heptafluoro-1-pentene ($CH_2=CFCF_2CF_2CF_2H$) and the like. An amount of the third component is preferably 0.1 to 3% by mole based on the fluorine-containing ethylenic polymer.

Also, a fluorine-containing ethylenic polymer comprising TFE and the perfluoro ethylenically unsaturated compound represented by the formula (1) is preferable from the viewpoint that the fluorine-containing resin composition is excellent in heat resistance, oil resistance, electrical properties and flame retardance and mold-processing is easy.

Specifically, the combinations such as TFE/hexafluoropropylene (hereinafter referred to as HFP), TFE/$CF_2=CF—OR_f^2$, and TFE/HFP/$CF_2=CF—OR_f^2$ can be exemplified. Examples of $CF_2=CF—OR_f^2$ are perfluoro(alkyl vinyl ethers) such as perfluoro(methyl vinyl ether), perfluoro(ethyl vinyl ether) and perfluoro(propyl vinyl ether).

Among these, TFE/HFP/$CF_2=CF—OR_f^2$ is preferable, the fluorine-containing ethylenic polymer (a) comprising 77 to 95% by mole of a TFE unit, 5 to 20% by mole of a HFP unit, and 0.1 to 3% by mole of —$CF_2=CF—OR_f^2$ unit is more preferable, and the fluorine-containing ethylenic polymer comprising 90 to 93% by mole of a TFE unit, 7 to 10% by mole of a HFP unit and 0.3 to 1% by mole of —$CF_2=CF—OR_f^2$ unit is further preferable since they are excellent in stress crack resistance and are also advantageous from the viewpoint of economical efficiency.

Particularly in the case of such a copolymer of TFE with the perfluoro ethylenically unsaturated compound represented by the formula (1), its melting point is 120° to 310° C., preferably 120° to 270° C. from the viewpoint that molding of the obtained fluorine-containing resin composition is easy. The melting point can be set by a copolymerization ratio of TFE to the perfluoro ethylenically unsaturated compound represented by the above-mentioned formula (1).

In the present invention, the compound to be used as the hydrofluoric acid scavenger (B) is organopolysiloxane. A molecular structure of the organopolysiloxane is not specifically limited. The organopolysiloxane may be one having a linear molecular structure or one having a linear molecular structure and partly having a branch. Examples of preferable organopolysiloxane are one or more of diorganopolysiloxane (b-1), silicone resin (b-2), crosslinkable silicone rubber composition (b-3) and crosslinked silicone rubber particles (b-4).

Examples of a group bonding to the silicon atom are alkyl groups having 1 to 8 carbon atoms such as a methyl group, an ethyl group, a propyl group, an isobutyl group, a hexyl group, and an octyl group; an aryl group such as a phenyl group; an aralkyl group such as a tolyl group; and halogenated alkyl groups such as 3,3,3-trifluoropropyl and a nonafluorobutylethyl group. Also, a crosslinkable reaction group, for example, an alkenyl group having 2 to 10 carbon atoms such as a vinyl group, an allyl group, or a hexenyl group; an alkoxyl group having 1 to 10 carbon atoms such as a methoxy group, an ethoxy group, a propoxy group, or a butoxy group; or a hydroxyl group may be bonded to the silicon atom.

Especially from the viewpoint of excellent flexibility and cold resistance and satisfactory economical efficiency, it is preferable that at least 50% of groups bonded to the silicon atom are methyl groups, and it is more preferable that all the groups other than the above-mentioned crosslinkable reaction groups are substantially methyl groups. In order to improve affinity for the fluorine-containing resin (A), 1 to 50% of the groups bonded to the silicon atom may be fluorinated alkyl groups such as 3,3,3-trifluoropropyl.

A weight average molecular weight of the organopolysiloxane is not specifically limited. In the case of the diorganopolysiloxane (b-1), a weight average molecular weight thereof is preferably 1,000 to 9,000,000, more preferably 100,000 to 9,000,000, especially preferably 450,000 to 4,500,000. When the weight average molecular weight of the diorganopolysiloxane (b-1) is within the above-mentioned range, it is preferable from the viewpoint that handling workability is improved, mixing with the fluorine-containing resin (A) is easy and flexibility of the obtained fluorine-containing resin composition is excellent. The weight average molecular weight of the organopolysiloxane can be measured as a value converted based on polystyrene by gel permeation chromatography (GPC).

The organopolysiloxane may be blended to the fluorine-containing resin (A) in a state of being carried on a surface of inorganic powder such as silica, diatomaceous earth, talc or calcium carbonate. Example of an available inorganic powder carrying diorganopolysiloxane (b-1) thereon is Torayfil F Series (brand name of Dow Corning Toray Co., Ltd.).

Examples of the silicone resin (b-2) are silicone resins having a branched or network molecular structure. Examples of these silicone resins are DT type or MDT type silicone resins comprising a tri-functional siloxane unit (hereinafter referred to as T unit) represented by the formula ($RSiO_{3/2}$) and as case demands, a bi-functional siloxane unit (hereinafter referred to as D unit) represented by the formula ($R_2SiO_{2/}$ 2) and a mono-functional siloxane unit (hereinafter referred to as M unit) represented by the formula $(R_3SiO_{1/2})$, and MQ resin comprising a tetra-functional siloxane unit (hereinafter referred to as Q unit) represented by the formula $(SiO_{4/2})$ and the M unit. In the above-mentioned formulae, examples of R are the same groups bonding to the silicon atom as exemplified above, and R may contain a crosslinkable reaction group as case demands.

The silicone resin may be in the form of solid or liquid at normal temperature. When the silicone resin is in the form of solid, it may have a melting point. From the viewpoint of handling workability and dispersibility, the silicone resin is preferably in the form of solid powder. Examples of an available silicone resin powder are Torayfil R Series (brand name of Dow Corning Toray Co., Ltd.).

It is also preferable that the organopolysiloxane is blended to the fluorine-containing resin (A) as the crosslinkable silicone rubber composition (b-3). The crosslinkable silicone rubber composition (b-3) may have been crosslinked or may not have been crosslinked, and an at least partly crosslinked silicone rubber is preferable. Particularly a silicone rubber subjected to dynamic crosslinking treatment in the presence of the fluorine-containing resin (A) is more preferable in that dispersibility in the fluorine-containing resin (A) is excellent and productivity is enhanced.

Herein, the dynamic crosslinking treatment means that the crosslinkable silicone rubber composition is melt-kneaded and at the same time dynamically crosslinked using a Banbury mixer, a compression kneader, an extruder or the like. Among these, extruders such as a twin screw extruder are preferably used from the viewpoint that high shearing force can be applied. A composition in which the silicone rubber is homogeneously dispersed in the fluorine-containing resin (A) can be obtained by carrying out the dynamic crosslinking treatment under the melting condition of the fluorine-containing resin (A).

Further, "under the melting condition" means "at a temperature at which the fluorine-containing resin (A) is melted". The melting temperature varies depending on a glass transition temperature and/or a melting point of the fluorine-containing resin (A), and is preferably 120° to 330° C., more preferably 130° to 320° C. When the temperature is less than 120° C., the dispersion between the fluorine-containing resin (A) and the silicone rubber tends to be rough, and when it exceeds 330° C., the silicone rubber tends to be thermally deteriorated.

The silicone rubber is preferably a crosslinked product which is obtained by crosslinking the crosslinkable silicone rubber composition by a condensation reaction, a hydrosilylation reaction or a radical reaction with an organic peroxide. A crosslinked product which is obtained by crosslinking by the hydrosilylation reaction is preferable from the viewpoint that a by-product is not generated in the crosslinking reaction.

The crosslinkable silicone rubber composition (b-3) is preferably a crosslinkable silicone rubber composition comprising the diorganopolysiloxane (b-1), more preferably a crosslinkable silicone rubber composition further comprising a crosslinking agent and a crosslinking catalyst, if necessary.

When the silicone rubber is a crosslinked product which is obtained by crosslinking the crosslinkable silicone rubber composition by the condensation reaction or hydrosilylation reaction, the crosslinkable silicone rubber composition preferably comprises the diorganopolysiloxane (b-1) containing at least two crosslinkable reaction groups in one molecule thereof, the crosslinking agent and the crosslinking catalyst.

When the silicone rubber is a crosslinked product which is obtained by crosslinking the crosslinkable silicone rubber composition by a radical reaction with an organic peroxide, the crosslinkable silicone rubber composition preferably comprises the diorganopolysiloxane (b-1) and the crosslinking catalyst.

Examples of the diorganopolysiloxane (b-1) are an alkenyl group-containing diorganopolysiloxane having, in one molecule thereof, at least two alkenyl groups having 2 to 10 carbon atoms, an alkoxyl group-containing diorganopolysiloxane having, in one molecule thereof, at least two alkoxyl groups having 1 to 10 carbon atoms, and a hydroxyl group-containing diorganopolysiloxane having at least two hydroxyl groups in one molecule thereof. These crosslinkable reaction groups such as an alkenyl group, an alkoxyl group and a hydroxyl group may exist at the end of the molecular chain of the diorganopolysiloxane (b-1), may exist in the side chain of its molecule, or may exist at both of them.

Examples of a group bonding to the silicon atom other than the crosslinkable reaction group are the same as exemplified above, and preferable examples of the diorganopolysiloxane (b-1) are diorganopolysiloxanes such as a dimethylsiloxane-methylvinylsiloxane copolymer end-capped with hydroxyl groups, a dimethylsiloxane-methylvinylsiloxane copolymer end-capped with trimethylsilyl groups, a dimethylpolysiloxane end-capped with dimethylvinylsilyl groups, a dimethylsiloxane-methylvinylsiloxane copolymer end-capped with dimethylvinylsilyl groups, a trifluoropropylmethylsiloxane-methylvinylsiloxane copolymer end-capped with hydroxyl groups, a trifluoropropylmethylsiloxane-methylvinylsiloxane-dimethylsiloxane copolymer end-capped with hydroxyl groups, a trifluoropropylmethylpolysiloxane end-capped with dimethylvinylsilyl groups, a trifluoropropylmethylsiloxane-dimethylsiloxane copolymer end-capped with dimethylvinylsilyl groups, a trifluoropropylmethylsiloxane-methylvinylsiloxane copolymer end-capped with dimethylvinylsilyl groups, and a trifluoropropylmethylsiloxane-methylvinylsiloxane-dimethylsiloxane copolymer end-capped with dimethylvinylsilyl groups.

When the silicone rubber is a crosslinked product which is obtained by crosslinking the crosslinkable silicone rubber composition by the condensation reaction, the diorganopolysiloxane (b-1) is preferably a diorganopolysiloxane containing, as the crosslinkable reaction group, at least two alkoxyl groups in one molecule thereof, or a diorganopolysiloxane containing, as the crosslinkable reaction group, at least two hydroxyl groups in one molecule thereof. A preferable alkoxyl group is an alkoxyl group having at most 3 carbon atoms.

When the silicone rubber is a crosslinked product which is obtained by crosslinking the crosslinkable silicone rubber composition by the condensation reaction, an example of the crosslinking agent is a silicon compound having, in one molecule thereof, at least 3 groups which are hydrolyzable with the crosslinkable reaction groups such as an alkoxyl group and a hydroxyl group in the diorganopolysiloxane (b-1) to carry out a condensation reaction. It is preferably a silicon compound containing an alkoxyl group, and examples thereof are alkyltrialkoxysilanes such as methyltrimethoxysilane, ethyltrimethoxysilane and methyltriethoxysilane, or methyltrihydrosilane. The compounding amount of the above-mentioned crosslinking agent is preferably 2 to 15 parts by mass based on 100 parts by mass of the diorganopolysiloxane (b-1).

When the silicone rubber is a crosslinked product which is obtained by crosslinking the crosslinkable silicone rubber composition by the condensation reaction, the crosslinking catalyst is a catalyst for promoting the crosslinking reaction by the condensation reaction of the crosslinkable silicone rubber composition, and examples thereof are tin catalysts such as di-n-butyltin diacetate, di-n-butyltin di-2-ethylhexoate, n-butyltin tri-2-ethylhexoate, di-n-butyltin dilaurate, di-n-butyltin dioctoate, tin octylate, tin octenoate, tin laurate, tin naphthenate, and tin oleate; organic titanate compounds such as tetra-n-butyl titanate, tetra-isopropyl titanate, tetra-2-ethylhexyl titanate and ethylene glycol titanate; titanium catalysts such as diisopropoxybis(acetylacetone)titanium, diisopropoxybis(ethyl acetoacetate)titanium, diisopropoxybis(methyl acetoacetate)titanium, dimethoxybis(methyl acetoacetate)titanium, dibuthoxybis(ethyl acetoacetate)titanium and titanium naphthenate; organic acid salt catalysts of a metal such as ferric stanooctenate, lead laurate, zinc octenoate, cobalt naphthenate, iron naphthenate, zinc naphthenate, zinc stearate, iron octenoate and lead octenoate; and amine catalysts such as n-hexylamine and guanidine; or a mixture of 2 or more of these catalysts for a condensation reaction. A compounding amount of the above-mentioned catalyst for a condensation reaction is preferably 0.001 to 20 parts by mass, more preferably 0.01 to 5 parts by mass based on 100 parts by mass of the diorganopolysiloxane (b-1).

When the silicone rubber is a crosslinked product which is obtained by crosslinking the crosslinkable silicone rubber composition by the hydrosilylation reaction, the diorganopolysiloxane (b-1) is preferably a diorganopolysiloxane containing, as a crosslinkable reaction group, at least 2 alkenyl groups in one molecule thereof. The alkenyl group is preferably an alkenyl group having 2 to 10 carbon atoms, and most preferably a vinyl group.

When the silicone rubber is a crosslinked product which is obtained by crosslinking the crosslinkable silicone rubber composition by the hydrosilylation reaction, an example of the crosslinking agent is an organopolysiloxane containing silicon atom-bonded hydrogen atoms which has at least 2 hydrogen atoms bonded to a silicon atom in one molecule thereof. Further, examples of other groups bonded to a silicon atom are the same groups as explained above. Examples of the organopolysiloxane containing silicon atom-bonded hydrogen atoms which has at least 2 hydrogen atoms bonded to a silicon atom in one molecule thereof are a dimethylpolysiloxane end-capped with hydrogen atoms, a dimethylsiloxane-methylhydrogensiloxane copolymer end-capped with trimethylsilyl groups, cyclic methylhydrogenpolysiloxane, organopolysiloxane comprising a siloxane unit represented by the formula: $(CH_3)HSiO_{1/2}$ and a siloxane unit represented by the formula: $SiO_{4/2}$, and a mixture of at least 2 of these. With respect to a compounding amount of the organopolysiloxane containing silicon atom-bonded hydrogen atoms which has at least 2 hydrogen atoms bonded to a silicon atom in one molecule thereof, the number of silicon atom-bonded hydrogen atoms to the number of alkenyl groups in the diorganopolysiloxane (b-1) is preferably within a range of 1:5 to 5:1, more preferably 1:3 to 2:1.

When the silicone rubber is a crosslinked product which is obtained by crosslinking the crosslinkable silicone rubber composition by the hydrosilylation reaction, examples of the crosslinking catalyst are platinum catalysts such as chloroplatinic acid, an alcohol solution of chloroplatinic acid, an olefin complex of platinum, an alkenylsiloxane complex of platinum, platinum black, and platinum supported on silica; rhodium catalysts such as rhodium chloride and rhodium chloride complex; and palladium catalysts such as palladium chloride and palladium supported on carbon. Among these, platinum-based catalysts are preferable from the viewpoint of high reactivity thereof. A compounding amount of the crosslinking catalyst is preferably 0.1 to 1,000 parts by mass based on 1,000,000 parts by mass of diorganopolysiloxane (b-1). Particularly, when it is a platinum-based catalyst, the amount of platinum metal is preferably 1 to 50 parts by mass based on 1,000,000 parts by mass of diorganopolysiloxane (b-1).

When the silicone rubber is a crosslinked product which is obtained by crosslinking the crosslinkable silicone rubber composition by the hydrosilylation reaction, a curing retardant is preferably further contained from the viewpoint that storage stability and handling workability of the crosslinkable silicone rubber are improved, and, in some cases, dispersibility to the fluorine-containing resin (A) is improved.

Examples of the curing retardant are acetylene compounds such as 2-methyl-3-butyn-2-ol, 3,5-dimethyl-1-hexyn-3-ol and 2-phenyl-3-butyn-2-ol: ene-yne compounds such as 3-methyl-3-penten-1-yne and 3,5-dimethyl-3-hexen-1-yne; organosiloxane compounds having at least 5% by mass of vinyl groups in one molecule thereof such as 1,3,5,7-tetramethyl-1,3,5,7-tetravinylcyclotetrasiloxane, 1,3,5,7-tetramethyl-1,3,5,7-tetrahexenylcyclotetrasiloxane, and methylvinylpolysiloxane end-capped with silanol groups; triazoles such as benzotriazole, phosphines, mercaptans, and hydrazines. An amount of these curing retardants is not specifically limited, and is preferably 0.001 to 5 parts by mass based on 100 parts by mass of diorganopolysiloxane (b-1).

When the silicone rubber is a crosslinked product which is obtained by crosslinking the crosslinkable silicone rubber composition by a radical reaction with an organic peroxide, the diorganopolysiloxane (b-1) is preferably diorganopolysiloxane containing, as a crosslinkable reaction group, at least 2 alkenyl groups in one molecule thereof. The diorganopolysiloxane (b-1) which does not contain a specific crosslinkable reaction group, for example, dimethylpolysiloxane end-capped with a trimethylsiloxy group can be also used depending on kind of an organic peroxide which is the crosslinking catalyst, but since crosslinking efficiency is high and many kinds of organic peroxides as the crosslinking catalyst can be used, at least 2 of the above-mentioned alkenyl groups are preferably contained in one molecule thereof. The alkenyl group is preferably an alkenyl group having 2 to 10 carbon atoms, most preferably a vinyl group.

When the silicone rubber is a crosslinked product which is obtained by crosslinking the crosslinkable silicone rubber composition by a radical reaction with an organic peroxide, examples of the crosslinking catalyst are organic peroxides such as benzoyl peroxide, t-butyl perbenzoate, orthomethylbenzoyl peroxide, para-methylbenzoyl peroxide, di-t-butyl peroxide, dicumyl peroxide, 1,1-bis(t-butylperoxy)-3,3,5-trimethylcyclohexane, 2,5-dimethyl-2,5-di(t-butylperoxy)hexane, 2,2-bis(t-butylperoxy)-p-diisopropylbenzene, t-butyl peracetate and t-butylcumyl peroxide. These may be used alone or a combination of at least 2 kinds thereof may be also used. A compounding amount of the crosslinking catalyst can be a catalyst amount, and is preferably 0.1 to 5 parts by mass based on 100 parts by mass of the diorganopolysiloxane (b-1).

When the silicone rubber is a crosslinked product which is obtained by crosslinking the crosslinkable silicone rubber composition by a radical reaction with an organic peroxide, it is not essential to compound the crosslinking agent but the above-mentioned crosslinking agent may be compounded if necessary.

Reinforcing fillers such as precipitated silica, fumed silica, fumed silica surface-treated for making the surface hydrophobic, and carbon black; non-reinforcing silica fillers such as quartz powder, diatom earth, and calcium carbonate such as precipitated calcium carbonate and ground calcium carbonate may be compounded if necessary in the crosslinkable silicone rubber composition used in the present invention. Among these, reinforcing silica fillers such as fumed silica and fumed silica surface-treated for making the surface hydrophobic and/or non reinforcing silica fillers such as quartz powder and diatom earth are preferably contained from the viewpoint that workability in handling and flame retardance of the silicone rubber, and dispersibility to the fluorine-containing resin (A) may be improved in some cases.

It is preferable that the reinforcing fillers and non-reinforcing fillers are previously compounded in the diorganopolysiloxane (b-1).

An addition amount of the reinforcing silica fillers is preferably 1 to 100 parts by mass, more preferably 10 to 60 parts by mass based on 100 parts by mass of the diorganopolysiloxane (b-1).

Further, an addition amount of the non-reinforcing silica fillers is preferably 5 to 200 parts by mass, more preferably 10 to 100 parts by mass based on 100 parts by mass of the diorganopolysiloxane (b-1).

When the reinforcing silica fillers are compounded in the diorganopolysiloxane (b-1), it is preferable that the surface of the reinforcing silica filler is made hydrophobic by simultaneously compounding with a hydroxyl group-containing low molecular weight diorganopolysiloxane, hexaorganodisilazane, and the like.

In addition, crosslinked silicone rubber particles (b-4) obtained by forming crosslinked silicone rubber into fine particles can be used as the hydrofluoric acid scavenger (B). Examples of the particle shape of the crosslinked silicone rubber particles are spherical shape and irregular shape, and spherical particles are preferable. A diameter of the particles is not specifically limited, and an average particle diameter is preferably 0.1 to 200 µm, particularly preferably 0.1 to 100 µm from the viewpoint that poor appearance is not caused by large particles. Further, crosslinked silicone rubber particles which contain a fluorine-containing organic group are preferable in order to improve affinity for the fluorine-containing resin (A).

Examples of a process for preparing the crosslinked silicone rubber particles (b-4) are, for instance, the following preparation processes, and from the viewpoint of easy control of a particle diameter and shape of the obtained crosslinked silicone rubber particles, the preparation processes 2 to 5 are preferable, and the preparation process 5 is particularly preferable.

(Preparation process 1) A process of grinding the crosslinked product of the crosslinkable silicone rubber composition.
(Preparation process 2) A process of crosslinking the crosslinkable silicone rubber composition to be a powder.
(Preparation process 3) A process of crosslinking the crosslinkable silicone rubber composition in dispersed state in water.
(Preparation process 4) A process of crosslinking the crosslinkable silicone rubber composition containing a surfactant to be a powder.
(Preparation process 5) A process of crosslinking the crosslinkable silicone rubber composition in an aqueous solution of a surfactant in a dispersed state, and then removing water.

The crosslinked silicone rubber particles obtained by these preparation processes are crosslinked articles obtained by crosslinking through a hydrosilylation reaction, condensation reaction, or radical reaction with an organic peroxide, preferably crosslinked articles obtained by crosslinking through a hydrosilylation reaction or condensation reaction. Examples of such crosslinked silicone rubber particles which can be used are commercially available Torayfil E Powder (brand name available from Dow Corning Toray Co., Ltd.), etc.

It is preferable that the hydrofluoric acid scavenger (B) is contained in an amount of not less than 1 part by mass and less than 30 parts by mass based on 100 parts by mass of the fluorine-containing resin (A). When the amount of the hydrofluoric acid scavenger (B) is too large, excellent properties of the fluorine-containing resin such as heat resistance and chemical resistance tend to be impaired, and on the other hand, when the amount of the hydrofluoric acid scavenger (B) is too small, an effect of scavenging hydrofluoric acid tends to be decreased. A preferable amount of the hydrofluoric acid scavenger (B) is not less than 3 parts by mass, further not less than 5 parts by mass, and less than 20 parts by mass, further less than 10 parts by mass based on 100 parts by mass of the fluorine-containing resin (A).

In addition, known inorganic filler-based hydrofluoric acid scavenger such as zinc oxide or hydrotalcite may be blended to such an extent not to impair the object of the present invention.

Further, to the fluorine-containing resin composition of the present invention may be blended various known additives. Examples of such additives are, for instance, a flame retardant, an inorganic filler, other polymers such as polyethylene, polypropylene, polyamide, polyester and polyurethane, a pigment, a lubricant, a photostabilizer, a weather resistance stabilizer, an anti-static agent, an ultraviolet absorbent, an anti-oxidant, a mold-releasing agent, a foaming agent, a perfume, an oil, a softening agent and the like.

A flame retardant is not specifically limited, and those generally used may be used optionally. Examples thereof are, for instance, titanium oxide, cerium oxide; metal hydroxides such as magnesium hydroxide and aluminum hydroxide; a phosphoric acid flame retardant; and halogen flame retardants such as a bromine flame retardant and a chlorine flame retardant. Among these, titanium oxide and cerium oxide are preferable from the viewpoint that heat resistance of the fluorine-containing resin (A) can be improved. In addition, flame retardant aids such as antimony trioxide or zinc borate; and fuming inhibitors such as molybdenum oxide may be used in combination. These flame retardants may be used alone or a plurality of these flame retardants may be used in combination. In addition, it is preferable from the viewpoint of handling workability that they are used as a mixture of flame retardants dispersed in the organopolysiloxane.

A compounding amount of the flame retardant is preferably 0.01 to 100 parts by mass, more preferably 0.1 to 50 parts by mass based on 100 parts by mass of the total of the fluorine-containing resin (A) and the hydrofluoric acid scavenger (B).

An inorganic filler is not specifically limited, and examples thereof are reinforcing inorganic fillers such as talc, clay and barium sulfate, and when fire resistance is necessary, preferable is at least one filler selected from the group consisting of wollastonite, zinc oxide, magnesium oxide, aluminum oxide and hydrotalcite because rigid char can be formed at the time of firing. Wollastonite is known as calcium metasilicate, and it is preferable that its aspect ratio is higher. A typical aspect ratio is at least 2:1, preferably at least 3:1. Further, an average particle diameter of wollastonite is preferably 2 to 30 µm, more preferably 5 to 15 µm. Preferable wollastonite available are NYAD1250 (available from NYCO (registered trademark) Minerals, Inc.), and Wollastonite C-8 (available from JFE MINERAL CO., LTD.).

A compounding amount of the inorganic filler is preferably 1 to 70 parts by mass, more preferably 3 to 15 parts by mass based on 100 parts by mass of the total of the fluorine-containing resin (A), the hydrofluoric acid scavenger (B) and the flame retardant.

The fluorine-containing resin composition of the present invention is a material for molding, and can be molded using general molding processes and molding equipment. For mold-processing, there can be used optional processes, for example, injection molding, extrusion molding, compression molding, blow molding, calender molding and vacuum molding. The fluorine-containing resin composition of the present invention is molded into a molded article having an optional shape depending on its intended purpose.

Further, the present invention encompasses molded articles such as a sheet, a film and an electric wire jacket which are formed by using the fluorine-containing resin composition of the present invention, and also encompasses a laminated structure having a layer comprising the fluorine-containing resin composition of the present invention and a layer comprising another material.

The fluorine-containing resin composition of the present invention, and a molded article, a sheet and a film comprising the composition can be used for automobile parts, machanical parts, electrical and electronic parts, OA parts, daily necessaries, building materials, sundries and the like, and the laminated structure can be used for food containers, fuel containers, tubes, hoses and the like.

EXAMPLES

The present invention is then explained by means of examples, but is not limited to them.

First, components used in Examples and Comparative Examples are explained below.

<Fluorine-Containing Ethylenic Polymer (a-1)>

A copolymer of TFE/HFP/perfluoro(propyl vinyl ether) having carboxyl group (molar ratio=91.9/7.7/0.4, a melting point of 260° C., the number of —COOH end groups=550 per 1,000,000 carbon atoms).

<Fluorine-Containing Ethylenic Polymer (a-2)>

A copolymer of TFE/HFP/perfluoro(propyl vinyl ether) (molar ratio=91.9/7.7/0.4, a melting point of 260° C., the number of carbonyl group-containing end groups=0 per 1,000,000 carbon atoms).

<Fluorine-Containing Ethylenic Polymer (a-3)>

A copolymer of TFE/ethylene/HFP/2,3,3,4,4,5,5-heptafluoro-1-pentene having —OCOCH$_2$CH$_2$CH$_3$ end group (molar ratio=38.9/45.9/14.8/0.4, a melting point of 172° C., the number of —OCOCH$_2$CH$_2$CH$_3$ end groups=411 per 1,000,000 carbon atoms).

<Pre-Mixed Hydrofluoric Acid Scavenger (B-1)>

A pre-mixed hydrofluoric acid scavenger prepared by the following method is used.

A mixture of organopolysiloxane and silica is prepared by kneading 70 parts by mass of a dimethylsiloxane-methylvinylsiloxane copolymer end-capped with dimethylvinylsilyl groups (an amount of vinyl group=0.088% by mass, a weight average molecular weight of about 620,000), 30 parts by mass of a polydimethylsiloxane end-capped with dimethylvinylsilyl groups (an amount of vinyl group=0.010% by mass, a weight average molecular weight of about 620,000), 39 parts by mass of fumed silica (MS-75D (brand name) available from Tokuyama Corporation), and 10.0 parts by mass of dimethylpolysiloxane end-capped with dimethylhydroxysilyl groups and having a viscosity of 40 mPa·s at 170° C. for 2 hours.

Then a mixture comprising 100 parts by mass of this diorganopolysiloxane/silica mixture, 0.01 part by mass of a crosslinking catalyst (chloroplatinic acid) and 104 parts by mass of wollastonite (NYAD 1250 (brand name) available from NYCO; an aspect ratio of 3:1, an average particle diameter of 3 μm) is kneaded with two rolls to prepare a pre-mixed hydrofluoric acid scavenger.

<Hydrofluoric Acid Scavenger (B-2)>

Crosslinked fluorosilicone rubber particles prepared by the following method are used.

A liquid fluorosilicone rubber composition having condensation reactivity is prepared by homogeneously mixing 65.5 parts by mass of a dimethylpolysiloxane end-capped with dimethylhydroxysilyl groups and having a viscosity of 40 mPa·s, 30 parts by mass of ethyl polysilicate (SILICATE 40 available from Tama Chemicals Co., Ltd.) and 4.5 parts by mass of 3,3,3-trifluoropropyltrimethoxysilane.

Next, this composition is emulsified in an aqueous solution comprising 8 parts by mass of polyoxyethylene lauryl ether and 40 parts by mass of pure water and further emulsified homogeneously with a colloid mill, and then thereto is added 140 parts by mass of pure water for dilution to prepare an emulsion of a liquid fluorosilicone rubber composition.

Then to this emulsion is mixed a catalyst for a condensation reaction prepared by dispersing 1 part by mass of tin octylate in an aqueous solution comprising 1 part by mass of polyoxyethylene lauryl ether and 10 parts by mass of pure water, followed by allowing to stand at room temperature for one day to obtain a homogeneous aqueous suspension of crosslinked fluorosilicone rubber particles. Then water is removed with a hot air dryer of 300° C., and thus crosslinked fluorosilicone rubber particles having an average particle diameter of 0.5 μm are obtained as the hydrofluoric acid scavenger (B-2).

<Crosslinking Agent>

A mixture comprising 100 parts by mass of a dimethylsiloxane-methylhydrogensiloxane copolymer end-capped with trimethylsilyl groups and having a viscosity of 12 mPa·s (an amount of hydrogen atoms bonding to a silicon atom: 0.83% by mass) and 20 parts by mass of fumed silica (Rheorosil DM-30 (brand name) available from Tokuyama Corporation) surface-treated with dimethyldichlorosilane.

Example 1

A 60 ml LABOPLASTOMIL manufactured by Toyo Seiki Seisaku-sho, Ltd. was heated up to 280° C., and 90 parts by mass of the fluorine-containing ethylenic polymer (a-1) was charged thereto at 10 rpm of a rotational frequency of a screw. Five minutes after, after confirming that the resin had been completely melted, 10 parts by mass of the pre-mixed hydrofluoric acid scavenger (B-1) was charged, and immediately the rotational frequency of the screw was increased to 80 rpm, followed by kneading for 10 minutes. Then 0.022 part by mass of the crosslinking agent was added and kneading was continued for another five minutes. The molten mixture was taken out from the LABOPLASTOMIL and allowed to cool to room temperature. The solidified fluorine-containing resin composition was cut into pieces with a pair of scissors for cutting a resin and thus about 100 parts by mass of about 2 mm square pellets were obtained.

Example 2

About 100 parts by mass of about 2 mm square pellets were obtained in the same manner as in Example 1 except that the amounts of the fluorine-containing ethylenic polymer (a-1), the pre-mixed hydrofluoric acid scavenger (B-1) and the crosslinking agent were changed to 95 parts by mass, 5 parts by mass and 0.011 part by mass, respectively.

Example 3

About 100 parts by mass of about 2 mm square pellets were obtained in the same manner as in Example 1 except that the amounts of the fluorine-containing ethylenic polymer (a-1), the pre-mixed hydrofluoric acid scavenger (B-1) and the crosslinking agent were changed to 99 parts by mass, 1 part by mass and 0.002 part by mass, respectively.

Example 4

About 100 parts by mass of about 2 mm square pellets were obtained in the same manner as in Example 1 except that the fluorine-containing ethylenic polymer (a-2) was used instead of the fluorine-containing ethylenic polymer (a-1).

Example 5

About 100 parts by mass of about 2 mm square pellets were obtained in the same manner as in Example 1 except that the fluorine-containing ethylenic polymer (a-3) was used instead of the fluorine-containing ethylenic polymer (a-1).

Example 6

A 60 ml LABOPLASTOMIL manufactured by Toyo Seiki Seisaku-sho, Ltd. was heated up to 280° C., and 90 parts by mass of the fluorine-containing ethylenic polymer (a-1) was charged thereto at 10 rpm of a rotational frequency of a screw. Five minutes after, after confirming that the resin had been completely melted, 10 parts by mass of the hydrofluoric acid scavenger (B-2) was charged, and immediately the rotational frequency of the screw was increased to 80 rpm, followed by kneading for 10 minutes. The molten mixture was taken out from the LABOPLASTOMIL and allowed to cool to room temperature. The solidified fluorine-containing resin composition was cut into pieces with a pair of scissors for cutting a resin and thus about 100 parts by mass of about 2 mm square pellets were obtained.

Comparative Example 1

A 60 ml LABOPLASTOMIL manufactured by Toyo Seiki Seisaku-sho, Ltd. was heated up to 280° C., and 100 parts by mass of the fluorine-containing ethylenic polymer (a-1) was charged thereto at 10 rpm of a rotational frequency of a screw. Five minutes after, after confirming that the resin had been completely melted, the molten resin was taken out from the LABOPLASTOMIL and allowed to cool to room temperature. The solidified fluorine-containing resin composition was cut into pieces with a pair of scissors for cutting a resin and thus about 100 parts by mass of about 2 mm square pellets were obtained.

Comparative Example 2

A 60 ml LABOPLASTOMIL manufactured by Toyo Seiki Seisaku-sho, Ltd. was heated up to 280° C., and 97 parts by mass of the fluorine-containing ethylenic polymer (a-1) was charged thereto at 10 rpm of a rotational frequency of a screw. Five minutes after, after confirming that the resin had been completely melted, 3 parts by mass of wollastonite was charged, and immediately the rotational frequency of the screw was increased to 80 rpm, followed by kneading for 10 minutes. The molten mixture was taken out from the LABOPLASTOMIL and allowed to cool to room temperature. The solidified fluorine-containing resin composition was cut into pieces with a pair of scissors for cutting a resin and thus about 100 parts by mass of about 2 mm square pellets were obtained.

Experimental Example 1

25 g each of the pellets produced in Examples 1 to 6 and Comparative Examples 1 and 2 was spread all over the bottom in an aluminum vessel, and thereon was placed a stainless steel sheet (AL 17-7 stainless steel available from Allegheny Ludlum) of 30 mm×30 mm×1 mm, and then this stainless steel sheet was covered with 25 g of pellets.

This aluminum vessel was heated in an electric oven at 300° C. in an atmosphere of air for four days. After allowing to cool, the stainless steel sheet was taken out and its surface condition was observed with naked eyes.

A stainless steel sheet heated in an aluminum vessel in the same manner as above without putting pellets therein was used as a reference, and a degree of discoloration on the surface of the sheet was evaluated on the basis of the following five grades (the reference stainless steel sheet which is not brought into contact with the fluorine-containing resin composition is assumed to be a grade 5). The results are shown in Table 1.

5: A metal gloss remains all over the surface (Reference stainless steel sheet)
4: There are some spots on the surface where a metal gloss is lost.
3: The overall surface is in a slightly foggy state.
2: There are partially dark corrosions.
1: There are dark corrosions all over the surface.

TABLE 1

|  | Reference | Example 1 | Example 2 | Example 3 | Example 4 | Example 5 | Example 6 | Comparative Example 1 | Comparative Example 2 |
|---|---|---|---|---|---|---|---|---|---|
| Fluorine-containing resin composition (part by mass) | | | | | | | | | |
| Fluorine-containing resin (A) | | | | | | | | | |
| (a-1) | — | 90 | 95 | 99 | — | — | 90 | 100 | 97 |
| (a-2) | — | — | — | — | 90 | — | — | — | — |
| (a-3) | — | — | — | — | — | 90 | — | — | — |
| Hydrofluoric acid scavenger (B) | | | | | | | | | |
| (B-1) | — | 10 | 5 | 1 | 10 | 10 | — | — | — |
| (B-2) | — | — | — | — | — | — | 10 | — | — |

TABLE 1-continued

|  | Reference | Example | | | | | | Comparative Example | |
|---|---|---|---|---|---|---|---|---|---|
|  |  | 1 | 2 | 3 | 4 | 5 | 6 | 1 | 2 |
| Crosslinking agent Wollastonite | — | 0.022 | 0.011 | 0.002 | 0.022 | 0.022 | — | — | — |
| Wollastonite derived from hydrofluoric acid scavenger | — | 5 | 2.5 | 0.5 | 5 | 5 | — | — | — |
| Wallastonite as an additive | — | — | — | — | — | — | — | — | 3 |
| Corrosiveness | 5 | 5 | 5 | 4 | 5 | 5 | 5 | 1 | 2 |

Experimental Example 2

With respect to the pellets obtained in Example 1 and Comparative Example 1, a concentration of eluted fluorine ion was measured by the following method. The concentration was 1.1 ppm in Comparative Example 1, and 0.3 ppm in Example 1.

(Concentration of Eluted Fluorine Ion)

Into a clean 50 ml polyethylene container are poured 5 g each of pellets prepared in Example and Comparative Example and 20 g of pure water, and the container is closed by putting a lid. The container is put in a sterilizer (Pasolina IST-150 manufactured by Kabushiki Kaisha Chiyoda Seisakusho) and heated at 121° C. for 60 minutes. After taking out the polyethylene container and cooling to room temperature, an amount of fluorine ion in the resultant aqueous solution is measured with a fluorine ion meter (Microprocessor Ionalyzer 910 manufactured by Orion). A concentration of eluted fluorine ion is calculated as a concentration (ppm) per a unit mass of the pellets.

The present invention can provide a fluorine-containing resin composition which can reduce an amount of hydrofluoric acid released from a fluorine-containing resin and inhibits corrosiveness.

What is claimed is:

1. A fluorine-containing resin composition for molding, comprising a fluorine-containing resin (A) which comprises a perfluororesin and a hydrofluoric acid scavenger (B), said hydrofluoric acid scavenger (B) being an organopolysiloxane.

2. The composition of claim 1, wherein said hydrofluoric acid scavenger (B) is contained in an amount of not less than 1 part by mass and less than 30 parts by mass based on 100 parts by mass of the fluorine-containing resin (A).

3. The composition of claim 2, wherein said fluorine-containing resin (A) comprises a copolymer comprising a tetrafluoroethylene unit and a unit of a perfluoro ethylenically unsaturated compound represented by the formula (1):

$$CF_2=CF-R_f^1 \tag{1}$$

wherein $R_f^1$ represents $-CF_3$ and/or $-OR_f^2$; $R_f^2$ represents a perfluoroalkyl group having 1 to 5 carbon atoms.

4. The composition of claim 1, wherein said fluorine-containing resin (A) comprises a fluorine-containing ethylenic polymer (a) having a carbonyl group-containing end group.

5. The composition of claim 3, wherein said fluorine-containing resin (A) comprises a fluorine-containing ethylenic polymer (a) having a carbonyl group-containing end group.

6. The composition of claim 4, wherein said fluorine-containing ethylenic polymer (a) has a melting point of 120° to 310° C.

7. The composition of claim 5, wherein said fluorine-containing ethylenic polymer (a) has a melting point of 120° to 310° C.

8. The composition of claim 1, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

9. The composition of claim 2, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

10. The composition of claim 5, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

11. The composition of claim 3, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

12. The composition of claim 4, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

13. The composition of claim 6, wherein the organopolysiloxane which is the hydrofluoric acid scavenger (B) is at least one kind selected from the group consisting of diorganopolysiloxane, silicone resin, crosslinkable silicone rubber composition and crosslinked silicone rubber particles.

* * * * *